US010996193B2

(12) United States Patent
Nakatsukasa et al.

(10) Patent No.: US 10,996,193 B2
(45) Date of Patent: May 4, 2021

(54) GAS SENSOR ELEMENT AND GAS SENSOR

(71) Applicant: NGK SPARK PLUG CO., LTD., Aichi (JP)

(72) Inventors: Takuya Nakatsukasa, Komaki (JP); Masaki Mizutani, Niwa-gun (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 97 days.

(21) Appl. No.: 16/110,484

(22) Filed: Aug. 23, 2018

(65) Prior Publication Data

US 2019/0064105 A1 Feb. 28, 2019

(30) Foreign Application Priority Data

Aug. 30, 2017 (JP) .............................. JP2017-165025
May 14, 2018 (JP) .............................. JP2018-093062

(51) Int. Cl.
*G01N 27/407* (2006.01)
*G01N 27/406* (2006.01)

(52) U.S. Cl.
CPC ..... *G01N 27/4077* (2013.01); *G01N 27/4067* (2013.01); *G01N 27/4071* (2013.01); *G01N 27/4075* (2013.01)

(58) Field of Classification Search
CPC ........... G01N 27/4077; G01N 27/4071; G01N 27/409
See application file for complete search history.

(56) References Cited

U.S. PATENT DOCUMENTS 4,272,349 A * 6/1981 Furutani ............ G01N 27/4077
 204/429
6,660,145 B2 * 12/2003 Hotta ................. G01N 27/4077
 204/427
(Continued)

FOREIGN PATENT DOCUMENTS

JP 2002-181769 A 6/2002
JP 2006-058282 A 3/2006
(Continued)

OTHER PUBLICATIONS

JP2012-241535 machine translation (Year: 2012).*
(Continued)

*Primary Examiner* — Luan V Van
*Assistant Examiner* — Caitlyn Mingyun Sun
(74) *Attorney, Agent, or Firm* — Stites & Harbison, PLLC; Jeffrey A. Haeberlin; James R. Hayne

(57) ABSTRACT

A gas sensor element includes: an element main body including an oxygen concentration detection cell and an oxygen pump cell; and a protective layer that covers the element main body. The element main body includes a heater section. The heater section is a heating element that heats the oxygen concentration detection cell and the oxygen pump cell. The protective layer includes: a first protective layer including a carrier composed mainly of a white ceramic and a noble metal catalyst supported on the carrier; and a second protective layer that is a layer composed mainly of a white ceramic and supporting no noble metal catalyst. The second protective layer externally covers the first protective layer, and a surface of the second protective layer serves as the outermost surface of the protective layer. The thickness of the second protective layer is smaller than the thickness of the first protective layer.

5 Claims, 5 Drawing Sheets

(56) References Cited

U.S. PATENT DOCUMENTS

| | | |
|---|---|---|
| 2002/0060152 A1 | 5/2002 | Hotta et al. |
| 2006/0024202 A1 | 2/2006 | Atsumi et al. |
| 2013/0104625 A1* | 5/2013 | Otsuka ............... G01N 27/4077 |
| | | 73/23.31 |
| 2015/0075254 A1 | 3/2015 | Sakuma et al. |
| 2016/0054256 A1* | 2/2016 | Sakuma ............. G01N 27/4071 |
| | | 204/408 |

FOREIGN PATENT DOCUMENTS

| | | |
|---|---|---|
| JP | 2012-241535 A | 12/2012 |
| JP | 2015-059758 A | 3/2015 |

OTHER PUBLICATIONS

Japan Patent Office, Office Action (Notice of Reasons for Refusal) issued in corresponding Application No. 2018-093062, dated Dec. 15, 2020.

Japan Patent Office, Office Action (Notice of Reasons for Refusal) issued in corresponding Application No. 2018-093062 dated Mar. 9, 2021.

* cited by examiner

GAS SENSOR ELEMENT AND GAS SENSOR

CROSS REFERENCE TO RELATED APPLICATION

The present application claims priority to Japanese Patent Application No. 2017-165025, which was filed on Aug. 30, 2017, and Japanese Patent Application No. 2018-093062, which was filed on May 14, 2018, the disclosures of which are herein incorporated by reference in their entirety.

BACKGROUND OF THE INVENTION

Field of the Invention

The present invention relates to a gas sensor element and to a gas sensor.

Description of Related Art

Patent Document 1 discloses an example of a gas sensor element used for an internal combustion engine. This gas sensor element includes a sensor section including: an ion-conductive solid electrolyte; a pair of electrodes (a measurement gas-side electrode and a reference gas-side electrode) disposed on opposite sides of the solid electrolyte; and a heat source that heats and activates the solid electrolyte. When this gas sensor element is used for sensing operation, a voltage for realizing a linear correlation between oxygen concentration difference and current is applied to the pair of electrodes. A measurement gas is brought into contact with the measurement gas-side electrode, and a reference gas such as air is brought into contact with the reference gas-side electrode. As a result, a current corresponding to the difference in oxygen concentration between the measurement gas and the reference gas flows between the electrodes. Therefore, the air-fuel ratio (A/F) in the vehicle engine can be determined by measuring the current value.

In the gas sensor element disclosed in Patent Document 1, a catalyst layer is disposed so as to cover the outer side of the sensor section. This catalyst layer is configured as a layer supporting a noble metal catalyst that facilitates a reaction with hydrogen gas. Moreover, a protective layer is disposed so as to cover the outer side of the catalyst layer. The protective layer is configured as a layer that prevents cracking of the sensor section due to adhesion of water thereto, traps hydrogen gas, carbon monoxide gas, etc. passing through the protective layer, and supports no noble metal catalyst.

RELATED ART DOCUMENT

Patent Document 1 is Japanese Patent Application Laid-Open (kokai) No. 2012-241535.

BRIEF SUMMARY OF THE INVENTION

In the gas sensor element in Patent Document 1, the protective layer is composed of alumina particles supporting no noble metal catalyst, and this highly bright white layer serves as the outermost layer of the gas sensor element. Generally, the heat dissipation performance of a black layer is high, and the heat dissipation performance of a white layer is low. In the case where the outermost layer is a white layer as in the gas sensor in Patent Document 1, heat dissipation to the outside space (the space outside the outermost layer) is suppressed as compared with the case where the outermost layer is a black layer. In this case, the sensor section and its vicinity can be heated efficiently, so that an increase in power consumption can be reduced accordingly.

When a white protective layer is disposed as the outermost layer as described above, the effect of reducing heat dissipation to the outside can be expected. However, in the structure of the gas sensor element in Patent Document 1, on the outer side of a black catalyst layer, a white protective layer having a much larger thickness than the black catalyst layer is disposed in contact with the catalyst layer. In this case, the effect of absorption of heat from the catalyst layer by the protective layer becomes remarkable. Specifically, since the outermost protective layer absorbs the internal heat (the heat around the catalyst layer), heat transfer to a portion to be heated (the sensor section disposed inward of the catalyst layer and its vicinity) is reduced, and the efficiency of heating deteriorates. This cause an increase in power consumption.

The present invention has been made so as to solve, at least partially, the above-described problem, and it is an object to provide a gas sensor element and a gas sensor in which their sensor section can be efficiently heated, so that their power consumption can be effectively reduced.

A gas sensor element which is one solving means of the present invention comprises: an element main body including at least one sensor section, the at least one sensor section including a solid electrolyte body and a pair of electrodes disposed on opposite surfaces of the solid electrolyte body; and a porous protective layer that covers the sensor section and is integrated with the element main body, wherein the element main body further includes a heater, the heater being a heating element that generates heat when energized and heats the at least one sensor section, and wherein the porous protective layer includes a first protective layer including a carrier composed mainly of a white ceramic and a noble metal catalyst supported on the carrier, and a second protective layer composed mainly of a white ceramic, the second protective layer being a layer supporting no noble metal catalyst or a layer which supports the noble metal catalyst, in which the amount of the noble metal catalyst supported is less than the amount of the noble metal catalyst in the first protective layer, and in which the average number of particles of the noble metal catalyst per 5×5 $\mu m^2$ on the outermost surface of the second protective layer is one or less, the second protective layer externally covering the first protective layer, at least part of the surface of the second protective layer serving as the outermost surface of the porous protective layer, the second protective layer having a thickness smaller than a thickness of the first protective layer.

In the above gas sensor element, the second protective layer is formed as a layer supporting no noble metal catalyst or a layer in which the amount of the noble metal catalyst supported thereon is very small. At least part of the second protective layer serves as the outermost layer of the protective layer. Specifically, since the second protective layer with a high degree of whiteness forms the entirety or a portion of the outermost surface of the protective layer, dissipation of heat from the second protective layer to the outside space is reduced, and the heating of a region inward of the protective layer (i.e., the sensor section covered with the protective layer) is facilitated accordingly.

The first protective layer covered with the second protective layer includes the noble metal catalyst supported on the carrier and has a higher degree of blackness than the second protective layer, and therefore the heat dissipation performance of the first protective layer is high. As described above, the second protective layer is in contact with the highly heat dissipative first protective layer so as to cover it. In this case, the second protective layer may excessively absorb the heat of the first protective layer, although this depends on the structure of the second protective layer. However, since the thickness of the second protective layer is smaller than the thickness of the first protective layer, the second protective layer is prevented from excessively absorbing the heat of the first protective layer. Therefore, escape of the heat of the first protective layer to the outside is restrained, and the heating of the sensor section disposed inward of the first protective layer is further facilitated.

As described above, the presence of the second protective layer reduces heat dissipation to the outside space, and excessive absorption of heat from the first protective layer by the second protective layer is also prevented, so that the sensor section is more efficiently heated. This further enhances the effect of reducing power consumption.

In the present invention, the phrase "the average number of particles of the noble metal catalyst per 5×5 µm$^2$ on the outermost surface is one or less" means that, on the outermost surface, the average number of particle of the noble metal catalyst present per 5×5 µm$^2$ is one or less.

In the above-described gas sensor element, the protective layer may further include a third protective layer composed mainly of a white ceramic. The third protective layer is a layer supporting no noble metal catalyst or a layer which supports the noble metal catalyst. The amount of the noble metal catalyst supported thereon is less than the amount of the noble metal catalyst in the first protective layer, and the average number of particles of the noble metal catalyst per 5×5 µm$^2$ on the outermost surface of the third protective layer is one or less. The third protective layer is disposed inward of the first protective layer. The third protective layer may have a thickness smaller than the thickness of the first protective layer and larger than the thickness of the second protective layer.

When the third protective layer is disposed inward of the first protective layer as described above, the effect of protecting the element main body is further enhanced. In particular, since the third protective layer is disposed inward of the first protective layer and has a high degree of whiteness, the third protective layer is easily heated, and its heat dissipation performance is low. Therefore, even if water entering the protective layer from the outside passes through the first protective layer and reaches the third protective layer, the water readily volatilizes in the third protective layer. Therefore, the water can be reliably prevented from entering the vicinity of the element main body. Since the thickness of the first protective layer is larger than the thickness of the third protective layer, the effect of the catalyst is higher in the first protective layer than in the third protective layer. Moreover, since the thickness of the second protective layer is smaller than the thickness of the third protective layer, the absorption of heat from the first protective layer by the second protective layer can be further reduced.

In the above-described gas sensor element, the first protective layer and the second protective layer may be composed mainly of the same ceramic material (i.e., the same white ceramic).

When the main component of the first protective layer and the main component of the second protective layer are the same ceramic material as described above, the effect of preventing the second protective layer from separating from the first protective layer can be enhanced.

In the above-described gas sensor element, the first protective layer, the second protective layer, and the third protective layer may be composed mainly of the same ceramic material (i.e., the same white ceramic).

When the main component of the first protective layer, the main component of the second protective layer, and the main component of the third protective layer are the same ceramic material as described above, the first protective layer, the second protective layer, and the third protective layer are less likely to separate from each other, and the stacking state of these layers becomes more likely to be maintained stably.

The above-described gas sensor element may be configured such that the average pore diameter of the third protective layer is larger than the average pore diameter of the first protective layer.

When the average pore diameter of the third protective layer is larger than the average pore diameter of the first protective layer as described above, capillarity is less likely to occur in the third protective layer than in the first protective layer, and the ability of the third protective layer to drain water can be improved. Therefore, water is unlikely to enter the third protective layer through the first protective layer, and waterproofness is further improved.

In the above-described gas sensor element, each of the white ceramics in the protective layer may be one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more thereof.

A gas sensor which is another solving means of the present invention comprises any of the above-described gas sensor elements, and a housing for holding the gas sensor element.

This gas sensor includes any of the above-described gas sensor elements. In the gas sensor element used, dissipation of heat from the first protective layer to the second protective layer is reduced, and dissipation of heat from the second protective layer to the outside space is also reduced. Therefore, the sensor section is more efficiently heated, and the effect of reducing power consumption is thereby further improved.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE INVENTION

A. First Embodiment

A1. Structure of Gas Sensor

Figure 1:
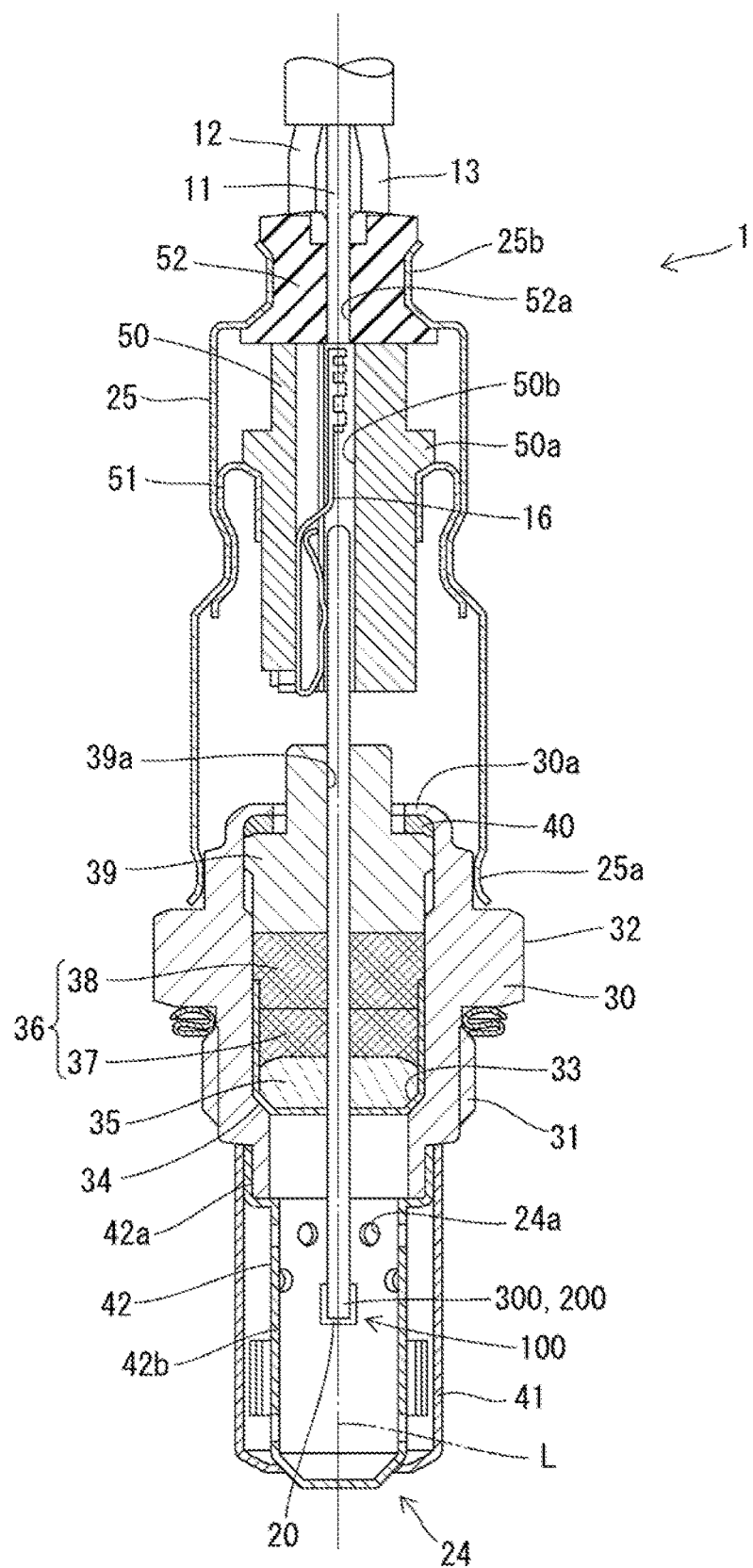
FIG. 1 is a cross-sectional view schematically showing a gas sensor of a first embodiment, the gas sensor being cut in its lengthwise direction.

A gas sensor 1 shown in FIG. 1 is a sensor that detects the concentration of a specific gas contained in, for example, exhaust gas from an internal combustion engine. The gas sensor 1 includes: a gas sensor element 100 having the function of detecting the concentration of the specific gas; a metallic shell 30 that holds therein the gas sensor element 100, etc.; a protector 24 attached to a forward end portion of the metallic shell 30; etc. The gas sensor 1 is formed so as to extend in the direction of an axial line L and has a shaft-like shape as a whole. In the present specification, the direction of the axial line L is the lengthwise direction of the gas sensor 1. In the following description, the direction of the axial line L is referred to also as the "axial direction."

First, the gas sensor element 100 will be described.

Figure 2:
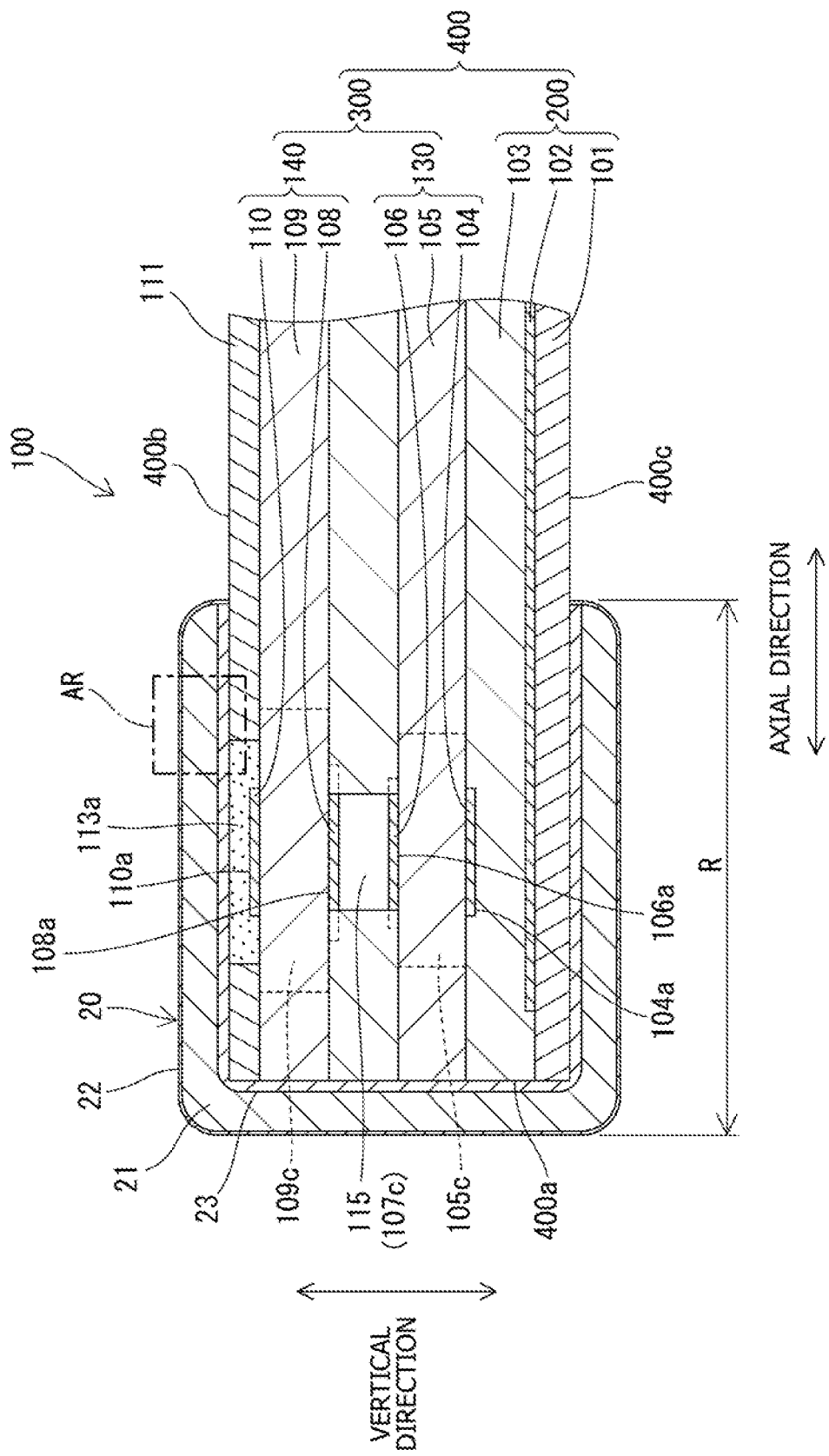
FIG. 2 is a cross-sectional view schematically showing a forward end portion of a gas sensor element of the gas sensor of FIG. 1, the gas sensor element being cut in its axial direction.

As shown in FIG. 1, the gas sensor element 100 is disposed so as to extend in the axial direction (the lengthwise direction of the gas sensor 1) and includes an element main body 400 and a porous protective layer 20, as shown in FIG. 2. The element main body 400 includes an oxygen concentration detection cell 130 and an oxygen pump cell 140 that correspond to examples of the sensor section. The element main body 400 includes mainly a detection element section 300 and a heater section 200. The detection element section 300 functions to detect the concentration of a specific gas (e.g., oxygen) in measurement gas. The heater section 200 corresponds to an example of the heater and is formed as a heating element. The heater section 200 is included in the element main body 400 and generates heat when energized. The heater section 200 has the function of heating the sensor sections (the oxygen concentration detection cell 130 and the oxygen pump cell 140). The porous protective layer 20 corresponds to an example of the protective layer and is disposed integrally with the element main body 400 so as to cover the element main body 400. Components of the gas sensor element 100 will next be described in detail. The porous protective layer 20 may be referred to also as the protective layer 20.

Figure 3:
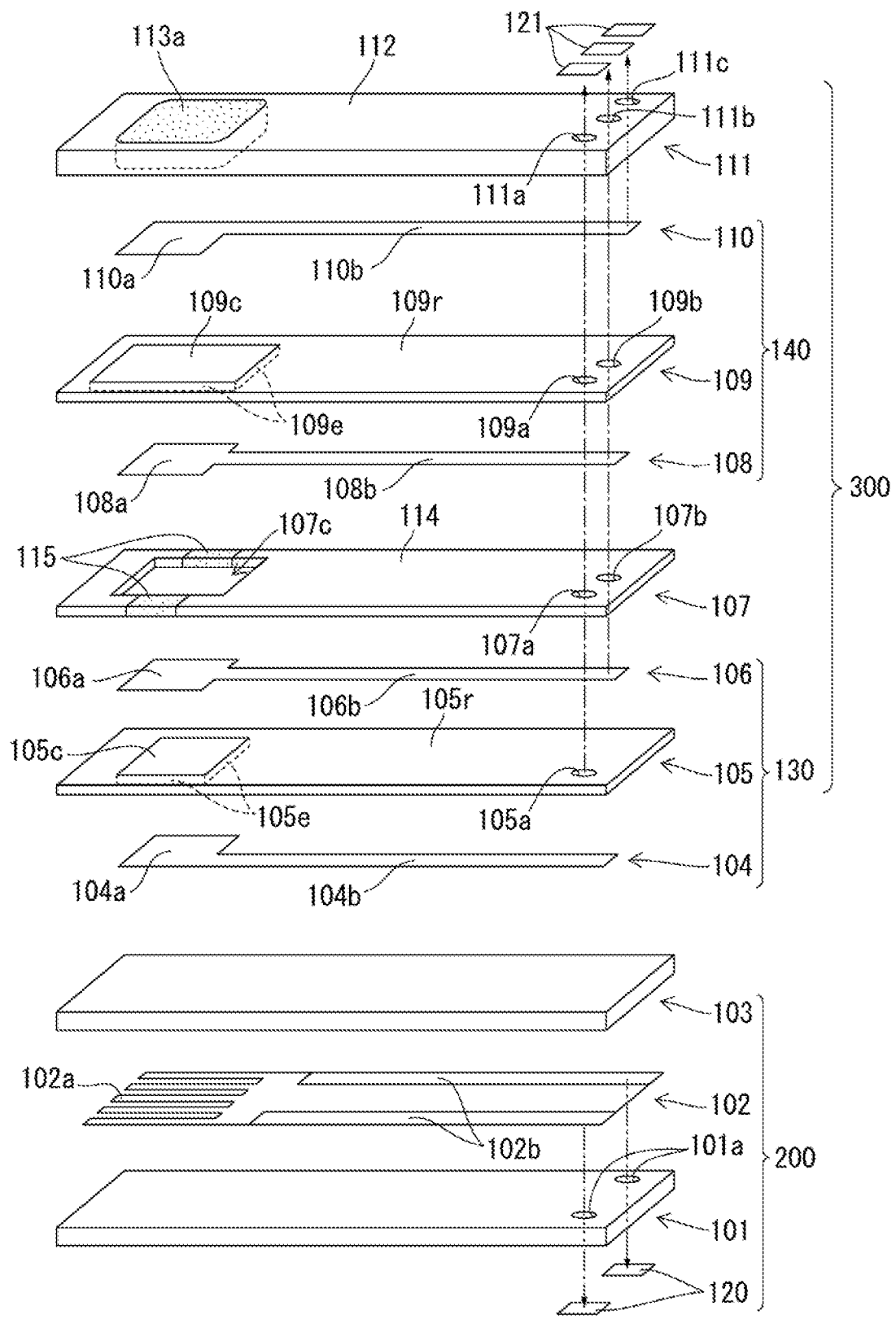
FIG. 3 is an exploded perspective view schematically showing a detection element and a heater of the gas sensor of FIG. 1 in an exploded state.

As shown in FIG. 3 the heater section 200 includes a first substrate 101 and a second substrate 103 that are composed mainly of alumina and further includes a heating element 102 sandwiched between the first and second substrates 101 and 103 and composed mainly of platinum. The heating element 102 includes a heat generating portion 102a disposed on a forward end side and a pair of heater lead portions 102b extending from the heat generating portion 102a in the lengthwise direction of the first substrate 101. Terminal ends of the heater lead portions 102b are electrically connected to heater-side pads 120 through conductors disposed in heater-side through holes 101a formed in the first substrate 101.

As shown in FIG. 3, the detection element section 300 includes the oxygen concentration detection cell 130 and the oxygen pump cell 140. The oxygen concentration detection cell 130 includes a first solid electrolyte body 105c, a reference electrode 104 disposed on one side of the first solid electrolyte body 105c, and a detection electrode 106 disposed on the other side of the first solid electrolyte body 105c. The first solid electrolyte body 105c corresponds to an example of the solid electrolyte body, and the reference electrode 104 and the detection electrode 106 correspond to an example of the pair of electrodes.

The first solid electrolyte body 105c has an approximately rectangular plate shape, and four edge surfaces 105e of the first solid electrolyte body 105c that are parallel to the direction of stacking are surrounded by a first support portion 105r. The first support portion 105r and the first solid electrolyte body 105c form a first layer 105. The first layer 105 extends in the lengthwise direction and has the same dimensions as an inner protective layer 111 described later, etc.

As shown in FIG. 3, the reference electrode 104 includes a reference electrode portion 104a and a first lead portion 104b extending from the reference electrode portion 104a in the lengthwise direction of the first layer 105. The detection electrode 106 includes a detection electrode portion 106a and a second lead portion 106b extending from the detection electrode portion 106a in the lengthwise direction of the first layer 105. As shown in FIG. 3, one end of the first lead portion 104b is electrically connected to a detection element-side pad 121 through a conductor disposed in each of a first through hole 105a formed in the first layer 105 (specifically, the first support portion 105r), a second through hole 107a formed in an insulating layer 107 described later, a fourth through hole 109a formed in a second layer 109 (specifically, a second support portion 109r), and a sixth through hole 111a formed in the inner protective layer 111. As shown in FIG. 3, one end of the second lead portion 106b is electrically connected to another detection element-side pad 121 through a conductor disposed in each of a third through hole 107b formed in the insulating layer 107 described later, a fifth through hole 109b formed in the second support portion 109r, and a seventh through hole 111b formed in the inner protective layer 111.

As shown in FIG. 3, the oxygen pump cell 140 includes a second solid electrolyte body 109c, an inner first pump electrode 108 disposed on one side of the second solid electrolyte body 109c, and an outer first pump electrode 110 disposed on the other side of the second solid electrolyte body 109c. The second solid electrolyte body 109c corresponds to an example of the solid electrolyte body, and the inner first pump electrode 108 and the outer first pump electrode 110 correspond to an example of the pair of electrodes.

The second solid electrolyte body 109c has an approximately rectangular plate shape, and four edge surfaces 109e of the second solid electrolyte body 109c that are parallel to the direction of stacking are surrounded by the second support portion 109r. The second support portion 109r and the second solid electrolyte body 109c form the second layer 109, and the second layer 109 extends in the lengthwise direction and has the same dimensions as the inner protective layer 111 described later, etc.

As shown in FIG. 3, the inner first pump electrode 108 includes an inner first pump electrode portion 108a and a third lead portion 108b extending from the inner first pump electrode portion 108a in the lengthwise direction of the second layer 109. The outer first pump electrode 110 includes an outer first pump electrode portion 110a and a fourth lead portion 110b extending from the outer first pump electrode portion 110a in the lengthwise direction of the second layer 109. As shown in FIG. 3, one end of the third lead portion 108b is electrically connected to a detection element-side pad 121 through a conductor disposed in each of the fifth through hole 109b formed in the second layer 109 (specifically the second support portion 109r) and the seventh through hole 111b formed in the inner protective layer 111. One end of the fourth lead portion 110b is electrically connected to another detection element-side pad 121 through a conductor disposed in an eighth through hole 111c formed in the inner protective layer 111 described later. The second lead portion 106b and the third lead portion 108b are equipotential.

The first solid electrolyte body 105c and the second solid electrolyte body 109c are each formed from a partially stabilized zirconia sintered body prepared by adding yttria ($Y_2O_3$) or calcia (CaO) serving as a stabilizer to zirconia ($ZrO_2$).

The heating element 102, the reference electrode 104, the detection electrode 106, the inner first pump electrode 108, the outer first pump electrode 110, the heater-side pads 120, and the detection element-side pads 121 may be each formed from a platinum group element. Preferably, one of Pt, Rh, Pd, etc. is used alone, or a combination of two or more may be used. In consideration of heat resistance and oxidation resistance, the platinum group element is more preferably mainly Pt. Preferably, a ceramic component is contained in addition to the platinum element. It is preferable in terms of adhesion that the ceramic component is the same as the main component of members on which the heating element, the electrodes, or the pads are stacked (e.g., the main component of the first solid electrolyte body 105c and the second solid electrolyte body 109c).

The insulating layer 107 is formed between the oxygen pump cell 140 and the oxygen concentration detection cell 130. The insulating layer 107 is composed of insulating portions 114 and diffusion controlling portions 115. A hollow gas detection chamber 107c is formed between the insulating portions 114 of the insulating layer 107 at a position corresponding to the detection electrode portion 106a and the inner first pump electrode portion 108a. The gas detection chamber 107c is in communication with the outside in the width direction of the insulating layer 107, and the diffusion controlling portions 115 that allow gas diffusion between the outside and the gas detection chamber 107c under prescribed rate-controlling conditions are disposed in the communicating portions.

No particular limitation is imposed on the material of the first support portion 105r, the second support portion 109r, the insulating portions 114, and a reinforcing portion 112 described later, so long as the material is an insulating ceramic sintered body. Examples of such a material include oxide ceramics such as alumina and mullite.

The diffusion controlling portions 115 and an electrode protecting portion 113a described later are porous bodies formed of a ceramic such as alumina. The diffusion controlling portions 115 control the flow rate of detection gas flowing into the gas detection chamber 107c.

As shown in FIG. 3, the inner protective layer 111 is formed on a surface of the second solid electrolyte body 109c such that the outer first pump electrode 110 is sandwiched therebetween. The inner protective layer 111 is a protective layer disposed inside a region surrounded by the protective layer 20 described later. The inner protective layer 111 includes: the porous electrode protecting portion 113a that covers the outer first pump electrode portion 110a to protect it from being poisoned; and the reinforcing portion 112 that covers the fourth lead portion 110b and supports the electrode protecting portion 113a. The electrode protecting portion 113a has an approximately rectangular plate shape, and four edge surfaces of the electrode protecting portion 113a that are parallel to the direction of stacking are surrounded by the reinforcing portion 112. The electrode protecting portion 113a is embedded in a forward end portion of the reinforcing portion 112. The reinforcing portion 112 extends in the lengthwise direction.

In the gas sensor element 100, the direction and magnitude of an electric current flowing between the electrodes of the oxygen pump cell 140 are controlled such that the voltage (electromotive force) generated between the electrodes of the oxygen concentration detection cell 130 is adjusted to a prescribed value (e.g., 450 mV). The gas sensor element 100 functions to linearly detect the concentration of oxygen in the measurement gas according to the current flowing through the oxygen pump cell 140. Moreover, the gas sensor element 100 measures the impedance (resistance) Rpvs of the first solid electrolyte body 105c of the oxygen concentration detection cell 130 intermittently, and the state of heating of the gas sensor element 100 by the heat generating portion 102a is feedback-controlled based on the impedance. The target control temperature of the oxygen concentration detection cell 130 heated by the heat generating portion 102a corresponds to a temperature converted from the impedance of the first solid electrolyte body 105c.

Next, components other than the gas sensor element 100 will be described.

The metallic shell 30 shown in FIG. 1 corresponds to an example of the housing. The metallic shell 30 is made of SUS430 and includes a male threaded portion 31 for attaching the gas sensor to an exhaust pipe and a hexagonal portion 32 with which an attachment tool is engaged when the gas sensor is attached to the exhaust pipe. The metallic shell 30 has a shell-side step portion 33 protruding radially inward, and the shell-side step portion 33 supports a metallic holder 34 used to hold the gas sensor element 100. A ceramic holder 35 and a talc layer 36 are disposed inside the metallic holder 34 in this order from the forward end side. The talc layer 36 includes a first talc layer 37 disposed inside the metallic holder 34 and a second talc layer 38 disposed so as to extend beyond the rear end of the metallic holder 34. The first talc layer 37 is compressed and packed inside the metallic holder 34, and the gas sensor element 100 is thereby fixed to the metallic holder 34. The second talc layer 38 is compressed and packed inside the metallic shell 30, and this provides the sealing between the outer surface of the gas sensor element 100 and the inner surface of the metallic shell 30. An alumina-made sleeve 39 is disposed rearward of the second talc layer 38. The sleeve 39 is formed into a stepped cylindrical shape and has an axial hole 39a extending along the axial line, and the gas sensor element 100 is inserted into the axial hole 39a. A crimp portion 30a at the rear end of the metallic shell 30 is bent inward, and the sleeve 39 is pressed toward the forward end of the metallic shell 30 through a stainless steel-made ring member 40.

A metallic protector 24 having a plurality of gas inlet holes 24a is welded to the outer circumference of a forward end portion of the metallic shell 30 so as to cover a forward end portion of the gas sensor element 100 protruding from the forward end of the metallic shell 30. The protector 24 has a double structure including: a closed-end cylindrical outer protector 41 disposed on the outer side and having a uniform outer diameter; and a closed-end cylindrical inner protector 42 disposed on the inner side and having a forward end portion 42b and a rear end portion 42a having an outer diameter larger than that of the forward end portion 42b.

The forward end of an outer tube 25 made of SUS430 is fitted to the rear end of the metallic shell 30. A forward end portion 25a of the outer tube 25, which portion is increased in diameter on the forward end side, is fixed to the metallic shell 30 by, for example, laser welding. A separator 50 is disposed inside a rear end portion of the outer tube 25, and a holding member 51 is interposed between the separator 50 and the outer tube 25. The holding member 51 engages with a protruding portion 50a, described later, of the separator 50. When the holding member 51 is crimped together with the outer tube 25, the holding member 51 is fixed between the outer tube 25 and the separator 50.

An insertion hole 50b into which lead wires 11 to 13, etc. for the detection element section 300 and the heater section 200 are inserted is formed in the separator 50 so as to extend therethrough from its forward end to its rear end. Connection terminals 16 that connect the lead wires 11 to 13, etc. to the detection element-side pads 121 of the detection element section 300 and the heater-side pads 120 of the heater section 200 are disposed in the insertion hole 50b. The lead wires 11 to 13, etc. are connected to an unillustrated external connecter. Input and output of electric signals are performed between the lead wires 11 to 13, etc. and an external device such as an ECU through the connector. Although the details are not shown, the lead wires 11 to 13, etc. each have a structure including a conductive wire coated with an insulating resin coating.

An approximately cylindrical rubber cap 52 is disposed rearward of the separator 50 to close a rear opening 25b of the outer tube 25. The rubber cap 52 is inserted into the rear end of the outer tube 25 and fixed to the outer tube 25 by crimping the outer circumference of the outer tube 25 radially inward. Insertion holes 52a into which the lead wires 11 to 13, etc. are inserted are formed in the rubber cap 52 so as to extend therethrough from its forward end to its rear end.

A2. Structure of Porous Protective Layer

Figure 4:
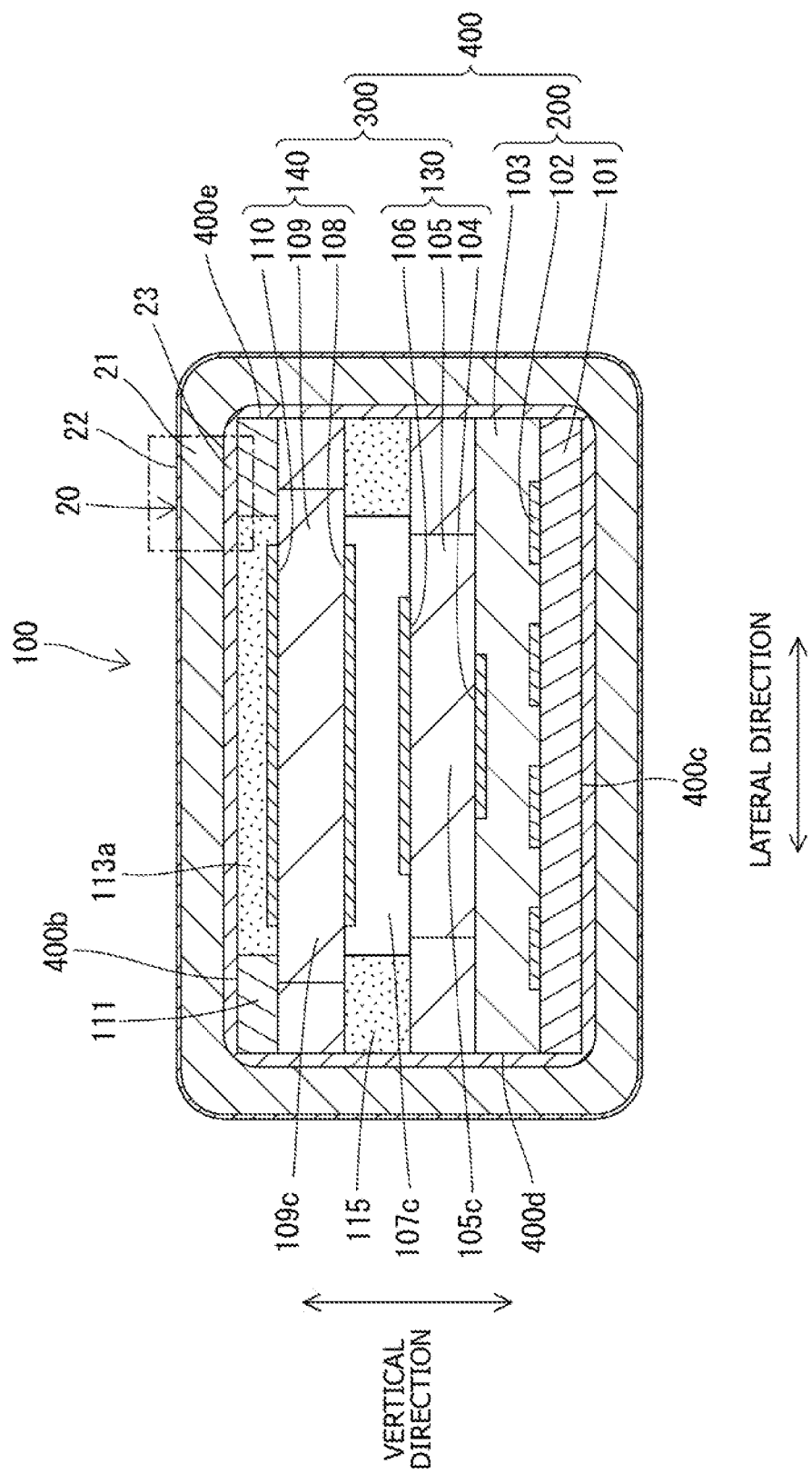
FIG. 4 is a cross-sectional view schematically showing the forward end portion of the gas sensor element of the gas sensor of FIG. 1, the gas sensor element being cut in a direction orthogonal to the axial direction.

As shown in FIGS. 2, and 4, the porous protective layer 20 is disposed at the forward end of the gas sensor element 100. The protective layer 20 is formed so as to surround the entire forward end portion (a forward end surface 400a and four side surfaces 400b, 400c, 400d, and 400e extending from the forward end surface 400a) of the element main body 400. As shown in FIG. 2, the protective layer 20 is formed in a prescribed region R extending in the axial direction from the forward end surface 400a of the element main body 400. The region R extends rearward in the axial direction beyond a region in which the reference electrode portion 104a, the detection electrode portion 106a, the inner first pump electrode portion 108a, and the outer first pump electrode portion 110a overlap each other. In the following description, a direction which is orthogonal to the axial direction and in which the heater section 200, the oxygen concentration detection cell 130, and the oxygen pump cell 140 are stacked is defined as a vertical direction. A direction orthogonal to the axial direction and the vertical direction is defined as a lateral direction.

As shown in FIG. 4, the protective layer 20 includes a first protective layer 21, a second protective layer 22, and a third protective layer 23. The layers forming the protective layer 20 are stacked from the inner side in the following order: the third protective layer 23, the first protective layer 21, and the second protective layer 22.

As shown in FIGS. 2 and 4, the third protective layer 23 is stacked on the outer surface of a forward end portion of the element main body 400. The third protective layer 23 is a ceramic layer composed mainly of a white ceramic (e.g., one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them) and supporting no noble metal catalyst. The third protective layer 23 does no support a noble metal catalyst (such as platinum) and is therefore formed as a white layer with a much higher brightness and a higher degree of whiteness than the first protective layer 21. The third protective layer 23 is disposed inward of the first protective layer 21 and the second protective layer 22 and is a layer forming the innermost surface of the protective layer 20. The third protective layer 23 is in contact with the forward end surface 400a and covers the entire forward end surface 400a. Moreover, the third protective layer 23 is in contact with the four side surfaces 400b, 400c, 400d, and 400e extending from the forward end surface 400a in the axial direction and covers the side surfaces 400b, 400c, 400d, and 400e within the region R.

As shown in FIGS. 2 and 4, the first protective layer 21 is stacked on the outer surface of the third protective layer 23. The first protective layer 21 is disposed so as to cover portions of the third protective layer 23 that are located on opposite sides in the vertical direction and opposite sides in the lateral direction (portions that cover the side surfaces 400b, 400c, 400d, and 400e of the element main body 400) and also cover a portion of the third protective layer 23 that is located on one side in the axial direction (a portion that covers the forward end surface 400a of the element main body 400). The first protective layer 21 is a catalyst layer including: a carrier composed mainly of a white ceramic (e.g., one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them); and a noble metal catalyst (such as platinum) supported on the carrier. In the first protective layer 21, the noble metal catalyst (such as platinum) is supported on the carrier. Therefore, the first protective layer 21 is formed as a black layer with a much lower brightness and a higher degree of blackness than the second protective layer 22 and the third protective layer 23. The first protective layer 21 functions as a catalyst layer that facilitates the combustion of unburnt gas, and this facilitates complete combustion of the unburnt gas.

The second protective layer 22 is stacked on the outer surface of the first protective layer 21. The second protective layer 22 is a ceramic layer composed mainly of a white ceramic (e.g., one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them) and supporting no noble metal catalyst. The second protective layer 22 does not support a noble metal catalyst (such as platinum) and is therefore formed as a white layer with a much higher brightness and a higher degree of whiteness than the first protective layer 21. The second protective layer 22 is formed such that its outer surface serves as the outermost surface of the protective layer 20. The outer surface of the second protective layer 22 is exposed to a space formed inside the protector 24 (a space into which the detection gas flows).

Figure 5:
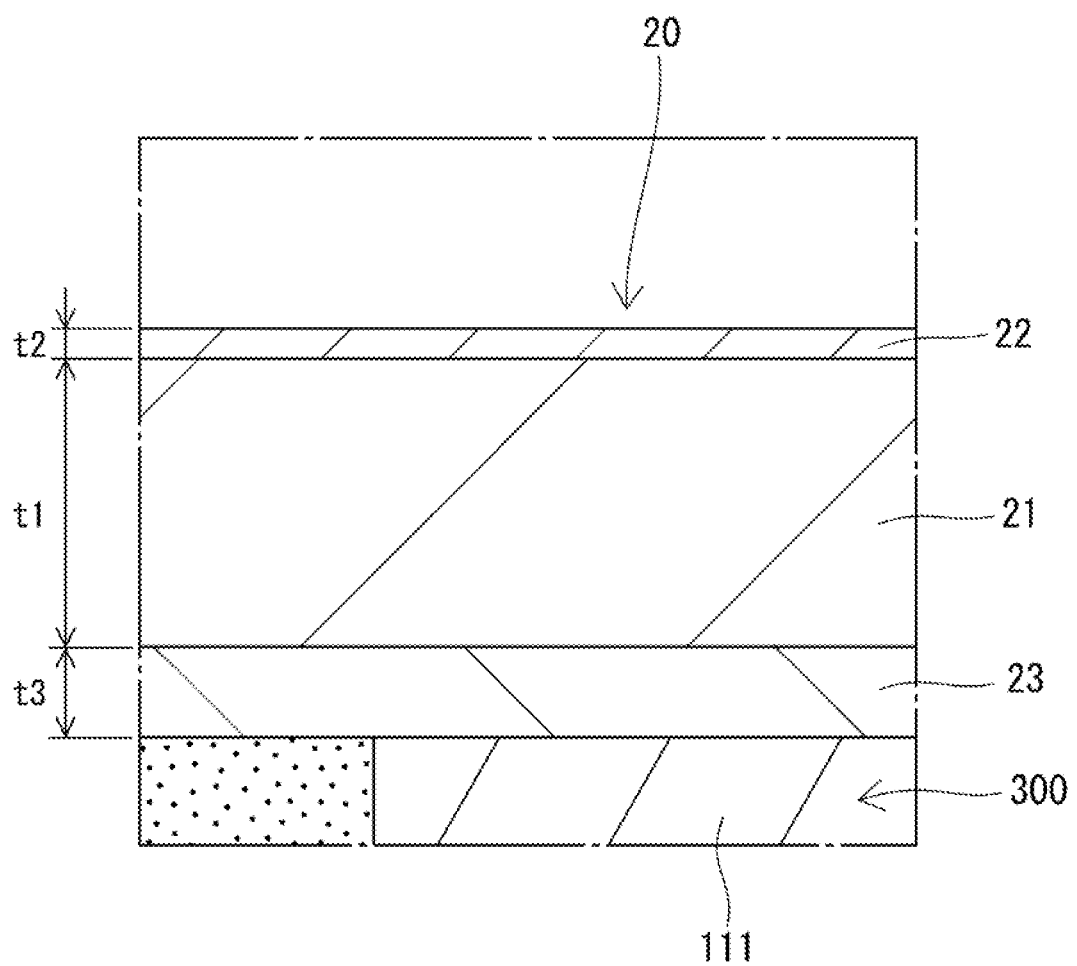
FIG. 5 is an enlarged cross-sectional view showing a portion of the cross-section of the gas sensor element shown in FIG. 4, the portion being near the surface of the gas sensor element.

FIG. 5 is an enlarged illustration showing a region AR in FIG. 2. As shown in FIG. 5, the thickness t2 of the second protective layer 22 in the stacking direction is smaller than the thickness t1 of the first protective layer 21 in the stacking direction. For example, the second protective layer 22 is formed such that its thickness t2 is equal to or less than one-half the thickness t1 of the first protective layer 21 (preferably about one-tenth the thickness t1) and is 1 μm or more. When the second protective layer 22 has a thickness of, for example, 1 μm, the absorption of heat from the first protective layer 21 can be further restained.

As shown in FIG. 5, the thickness t3 of the third protective layer 23 in the stacking direction is smaller than the thickness t1 of the first protective layer 21 in the stacking direction and is larger than the thickness t2 of the second protective layer 22 in the stacking direction. The thickness t3 of the third protective layer 23 is, for example, equal to or less than one-half the thickness t1 of the first protective layer 21 (preferably about one-third the thickness t1).

The average pore diameter of the third protective layer 23 is, for example, 20 μm and is larger than the average pore diameter of the first protective layer 21. As described above, the size of pores formed in the third protective layer 23 is larger than the size of pores formed in the first protective layer 21. Therefore, capillarity is less likely to occur in the third protective layer 23 than in the first protective layer 21, and water is unlikely to enter the third protective layer 23 through the first protective layer 21.

A3. Method for Producing Gas Sensor Element

A green heater section 200 is prepared as follows. A green first substrate 101 and a green second substrate 103 are each prepared by mixing a raw material powder such as alumina powder, a binder, a plasticizer, etc. to obtain a paste, forming the paste into a green sheet by, for example, a doctor blade method, drying the green sheet, and cutting the green sheet into a prescribed size. A paste prepared by mixing a raw material powder such as Pt powder, a binder, a plasticizer, etc. is applied to the first substrate 101 by, for example, screen printing and dried to form a green heating element 102. The green first substrate 101 is stacked on the green second substrate 103 with the green heating element 102 therebetween.

A rectangular piece is cut away from a forward end portion of a green first support portion 105r, which is a green alumina sheet. A green first solid electrolyte body 105c formed from a partially stabilized zirconia green sheet is embedded in the hollow portion. A paste is applied by printing to the front and rear surfaces of the green first solid electrolyte body 105c to form a green reference electrode 104 and a green detection electrode 106, and a green oxygen concentration detection cell 130 is thereby obtained. Pastes are applied by printing to the detection electrode 106-side surface of the green first solid electrolyte body 105c to form green insulating portions 114 and green diffusion controlling portions 115.

A rectangular piece is cut away from a forward end portion of a green second support portion 109r, which is a green alumina sheet. A green second solid electrolyte body 109c formed from a partially stabilized zirconia green sheet is embedded in the hollow portion. A paste is applied by printing to the front and rear surfaces of the green second solid electrolyte body 109c to form a green inner first pump electrode 108 and a green outer first pump electrode 110, and a green oxygen pump cell 140 is thereby obtained. The green heater section 200, the green oxygen concentration detection cell 130, and the green oxygen pump cell 140 are stacked, and the entire stack is fired to produce the element main body 400.

The third protective layer 23 is formed over the entire surface of a forward end portion of the element main body 400. The third protective layer 23 is formed, for example, by firing a slurry containing ceramic particles (e.g., particles of one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them) to bind the particles. By firing the slurry containing the ceramic particles, a coating can be formed. When a slurry containing a burnable pore-forming material added thereto is fired, the pore-forming material is burnt away and forms pores. In this manner, pores can be formed in the skeleton of the coating. The pore-forming material used may be, for example, carbon, resin-made beads, or organic or inorganic binder particles.

The first protective layer 21 is formed over the entire surface of the third protective layer 23. The first protective layer 21 is formed by, for example, firing a slurry containing ceramic particles (e.g., particles of one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them) supporting a noble metal catalyst (e.g., platinum) to bind the particles. To prepare the platinum-supported ceramic particles, the ceramic particles are, for example, immersed in chloroplatinic acid, and the resulting ceramic particles are subjected to heat treatment.

Then the second protective layer 22 is formed over the entire surface of the first protective layer 21. The second protective layer 22 is formed similarly to the third protective layer 23. Specifically, a slurry containing ceramic particles (e.g., particles of one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them) is fired to bind the ceramic particles. When the second protective layer 22 is formed, pores are formed by the same method as that for the third protective layer 23. The protective layer 20 including the first protective layer 21, the second protective layer 22, and the third protective layer 23 can be formed in the manner described above.

A4. Effects

In the gas sensor element 100, the second protective layer 22 is formed as a layer with no noble metal catalyst supported thereon. This second protective layer 22 is formed as the outermost surface of the protective layer 20. Specifically, the second protective layer 22 with a very high degree of whiteness forms the entire outermost surface of the protective layer 20. Therefore, heat dissipation from the second protective layer 22 to an outer region (the space outside the second protective layer 22 in the example in FIG. 1) is reduced, and the heating of the inner side of the protective layer 20 (i.e., the sensor sections (the oxygen concentration detection cell 130 and the oxygen pump cell 140) covered with the second protective layer 22) is facilitated accordingly. In the first protective layer 21 covered with the second protective layer 22, the noble metal catalyst is supported on the carrier. The first protective layer 21 is a black layer with a high relative degree of blackness, and therefore the heat dissipation performance of the first protective layer 21 is high. The second protective layer 22 is in contact with the highly heat dissipative first protective layer 21 so as to cover it. In this case, the second protective layer 22 may absorb the heat of the first protective layer 21. However, since the thickness of the second protective layer 22 is reduced so as to be smaller than the thickness of the first protective layer 21, the second protective layer 22 is prevented from excessively absorbing the heat of the first protective layer 21. Therefore, escape of the heat of the first protective layer 21 to the outside is restrained, and the heating of the sensor sections (the oxygen concentration detection cell 130 and the oxygen pump cell 140) disposed inward of the first protective layer 21 is further facilitated. As described above, the presence of the second protective layer 22 reduces heat dissipation to the outside space, and excessive absorption of heat of the first protective layer 21 by the second protective layer 22 is also prevented, so that the sensor sections (the oxygen concentration detection cell 130 and the oxygen pump cell 140) are more efficiently heated. This further enhances the effect of reducing power consumption.

In particular, in the gas sensor 1 configured as described above, the sensor sections (the oxygen concentration detection cell 130 and the oxygen pump cell 140) can be heated efficiently, and the temperature of the sensor sections can be increased with less electric power. Therefore, when, for example, feedback control is used to maintain constant the target control temperature of the oxygen concentration detection cell 130, the oxygen concentration detection cell 130 can be maintained at the target control temperature while the power consumption is effectively reduced.

In the gas sensor element 100, the protective layer 20 includes the third protective layer 23 that is disposed inward of the first protective layer 21 and is a layer composed mainly of a white ceramic and supporting no noble metal catalyst. As shown in FIG. 5, the thickness t3 of the third protective layer 23 is smaller than the thickness t1 of the first protective layer 21 and larger than the thickness t2 of the second protective layer 22. When the third protective layer 23 is disposed inward of the first protective layer 21 as described above, the effect of protecting the element main body is further enhanced. In particular, since the third protective layer 23 is disposed inward of the first protective layer 21 and has a high degree of whiteness, the third protective layer 23 is easily heated, and its heat dissipation performance is low. Therefore, even if water entering the protective layer from the outside passes through the first protective layer 21 and reaches the third protective layer 23, the water readily volatilizes in the third protective layer 23. Therefore, the water can be reliably prevented from entering the vicinity of the element main body. Since the thickness t1 of the first protective layer 21 is larger than the thickness t3 of the third protective layer 23, the effect of the catalyst is higher in the first protective layer 21 than in the third protective layer 23. Moreover, since the thickness t2 of the second protective layer 22 is smaller than the thickness t3 of the third protective layer 23, absorption of heat from the first protective layer 21 by the second protective layer 22 can be further reduced.

In the gas sensor element 100, the first protective layer 21 and the second protective layer 22 are composed mainly of the same ceramic material (e.g., one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them). When the main component of the first protective layer 21 and the main component of the second protective layer 22 are the same ceramic material, the effect of preventing the second protective layer 22 from separating from the first protective layer 21 is enhanced.

More specifically, the first protective layer 21, the second protective layer 22, and the third protective layer 23 are composed mainly of the same ceramic material (e.g., one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them). When the main component of the first protective layer 21, the main component of the second protective layer 22, and the main component of the third protective layer 23 are the same ceramic material, the first protective layer 21, the second protective layer 22, and the third protective layer 23 are less likely to separate from each other, and the stacking state of these layers becomes more likely to be maintained stably.

In the gas sensor element 100, the average pore diameter of the third protective layer 23 is larger than the average pore diameter of the first protective layer 21. When the average pore diameter of the third protective layer 23 is larger than the average pore diameter of the first protective layer 21 as described above, capillarity is less likely to occur in the third protective layer 23 than in the first protective layer 21, and the ability of the third protective layer 23 to drain water can be enhanced. Therefore, water is unlikely to enter the third protective layer 23 through the first protective layer 21, and waterproofness is further improved.

Other Embodiments

The present invention is not limited to the embodiment described above with reference to the drawings. For example, the following examples are included in the technical scope of the present invention.

In the description of the first embodiment, the gas sensor 1 shown as an example of the gas sensor is of the stacking type including the detection element section 300 and the heater section 200 that are stacked to form the gas sensor element 100, but the structure of the gas sensor element 100 is not limited to the structure in which the element main body and the heater are integrated to form the stacking structure. For example, the gas sensor 1 may be a gas sensor including a heater section contained inside a tubular detection element section (a so-called cup-type gas sensor).

In the description of the first embodiment, there has been described an example in which the heating state is feedback-controlled to maintain constant the target control temperature of the oxygen concentration detection cell 130. However, the gas sensor may be applied to a configuration in which no feedback control is performed.

In the description of the first embodiment, the second protective layer 22 is formed to have a thickness of 1 µm. However, the thickness of the second protective layer 22 may be other than 1 µm, and the second protective layer 22 may have a thickness equal to or larger than 1 µm and smaller than the thickness of the first protective layer 21.

In the description of the first embodiment, there has been described an example in which each of the second protective layer 22 and the third protective layer 23 is a layer that does not support a noble metal catalyst (such as platinum), but this is not a limitation. For example, the second protective layer 22 may be a layer which supports the noble metal catalyst, in which the amount of the noble metal catalyst supported is less than that in the first protective layer 21, and in which the average number of particles of the noble metal catalyst per 5×5 µm$^2$ on the outermost surface (the surface facing a space to which the second protective layer 22 is exposed) is 1 or less. Specifically, on the outermost surface of the second protective layer 22, the average number of particles of the noble metal catalyst per 5×5 µm$^2$ may be 1 or less. The third protective layer 23 may be a layer which supports the noble metal catalyst, in which the amount of the noble metal catalyst supported is less than that in the first protective layer 21, and in which the average number of particles of the noble metal catalyst per 5×5 µm$^2$ on the outermost surface (the surface at the interface with the first protective layer 21) is 1 or less. Specifically, on the outermost surface of the third protective layer 23, the average number of particles of the noble metal catalyst per 5×5 µm$^2$ may be 1 or less.

In the description of the first embodiment, there has been described an example in which the second protective layer 22 is formed such that its entire surface serves as the outermost surface of the protective layer 20. However, the second protective layer 22 may be formed such that a portion of its surface serves as the outermost surface of the protective layer 20. For example, the second protective layer may be disposed so as to cover only part of the outer surface of the first protective layer.

In the description of the first embodiment, there has been described an example in which the main component of the first protective layer 21, the main component of the second protective layer 22, and the main component of the third protective layer 23 are the same white ceramic (e.g., one of alumina ($Al_2O_3$), titania ($TiO_2$), zirconia ($ZrO_2$), magnesia (MgO), mullite ($Al_2O_3$—$SiO_2$), spinel ($MgAl_2O_4$), and cordierite (MgO—$Al_2O_3$—$SiO_2$) or a mixture containing two or more of them). However, any known white ceramic may be used.

In the description of the first embodiment, there has been described an example in which the main component of the first protective layer 21, the main component of the second protective layer 22, and the main component of the third protective layer 23 are the same ceramic material. One of these main components may be a different ceramic material, or all the main components may be different ceramic materials.

DESCRIPTION OF REFERENCE NUMERALS

1: gas sensor
20: protective layer
21: first protective layer
22: second protective layer
23: third protective layer
30: metallic shell (housing)
100: gas sensor element
104: reference electrode (electrode)
105c: first solid electrolyte body (solid electrolyte body)
106: detection electrode (electrode)
108: inner first pump electrode (electrode)
109c: second solid electrolyte body (solid electrolyte body)
110: outer first pump electrode (electrode)
130: oxygen concentration detection cell (sensor section)
140: oxygen pump cell (sensor section)
200: heater section (heater)
400: element main body

What is claimed is:

1. A gas sensor element comprising:
an element main body including:
at least one sensor section, the at least one sensor section including a solid electrolyte body and a pair of electrodes disposed on opposite surfaces of the solid electrolyte body, and
a heater, the heater being a heating element that generates heat when energized and heats the at least one sensor section; and
a porous protective layer covering the at least one sensor section and integrated with the element main body,
the porous protective layer including:
a first protective layer including a carrier composed mainly of a white ceramic and a noble metal catalyst supported on the carrier, and
a second protective layer externally covering the first protective layer, at least part of an outermost surface of the second protective layer serving as an outermost surface of the porous protective layer, the second protective layer having a thickness smaller than a thickness of the first protective layer, the second protective layer composed mainly of a white ceramic, the second protective layer being: (i) a layer supporting no noble metal catalyst, or (ii) a layer which supports a noble metal catalyst, in which the amount of the noble metal catalyst supported thereon is less than the amount of the noble metal catalyst in the first protective layer, and in which an average number of particles of the noble metal catalyst per $5\times 5$ $\mu m^2$ on the outermost surface of the second protective layer is one or less;
wherein the second protective layer has a thickness equal to or less than one-half the thickness of the first protective layer;
wherein the second protective layer has a thickness equal to or larger than 1 $\mu m$;
wherein the porous protective layer further includes a third protective layer disposed inward of the first protective layer, the third protective layer having a thickness smaller than the thickness of the first protective layer and larger than the thickness of the second protective layer, the third protective layer composed mainly of a white ceramic, the third protective layer being: (i) a layer supporting no noble metal catalyst, or (ii) a layer which supports a noble metal catalyst, in which the amount of the noble metal catalyst supported thereon is less than the amount of the noble metal catalyst in the first protective layer, and in which an average number of particles of the noble metal catalyst per $5\times 5$ $\mu m^2$ on an outermost surface of the third protective layer is one or less; and
wherein an average pore diameter of the third protective layer is larger than an average pore diameter of the first protective layer.

2. The gas sensor element according to claim 1, wherein the first protective layer and the second protective layer are composed mainly of the same white ceramic.

3. The gas sensor element according to claim 1, wherein the first protective layer, the second protective layer, and the third protective layer are composed mainly of the same white ceramic.

4. The gas sensor element according to claim 1, wherein each of the white ceramic of the first protective layer, the white ceramic of the second protective layer, and the white ceramic of the third protective layer is one of alumina (Al2O3), titania (TiO2), zirconia (ZrO2), magnesia (MgO), mullite (Al2O3-SiO2), spinel (MgAl2O4), and cordierite (MgO-Al2O3-SiO2) or a mixture containing two or more thereof.

5. A gas sensor comprising:
the gas sensor element according to claim 1; and
a housing that holds the gas sensor element.

* * * * *